(12) United States Patent
Cepero Gonzalez

(10) Patent No.: US 8,341,608 B2
(45) Date of Patent: Dec. 25, 2012

(54) CROSS-BROWSER TOOLBAR AND METHOD THEREOF FOR FACILITATING CROSS-BROWSER INTEROPERABILITY

(75) Inventor: Miguel Enrique Cepero Gonzalez, Brossard (CA)

(73) Assignee: Visicom Media, Inc., Brossard (Quebec) (CA)

( * ) Notice: Subject to any disclaimer, the term of this patent is extended or adjusted under 35 U.S.C. 154(b) by 1047 days.

(21) Appl. No.: 12/270,421

(22) Filed: Nov. 13, 2008

(65) Prior Publication Data
US 2010/0122157 A1 May 13, 2010

(51) Int. Cl.
*G06F 9/45* (2006.01)
*G06F 9/44* (2006.01)

(52) U.S. Cl. .................. 717/140; 717/116; 717/136

(58) Field of Classification Search .......... 717/114–116, 717/136–143
See application file for complete search history.

(56) References Cited

U.S. PATENT DOCUMENTS

| | | | |
|---|---|---|---|
| 6,675,230 B1 | 1/2004 | Lewallen | |
| 6,714,928 B1 * | 3/2004 | Calow | 1/1 |
| 6,725,424 B1 | 4/2004 | Schwerdtfeger | |
| 6,973,625 B1 * | 12/2005 | Lupo et al. | 715/762 |
| 7,054,952 B1 | 5/2006 | Schwerdtfeger | |
| 7,096,445 B1 * | 8/2006 | Pucci et al. | 716/119 |
| 7,305,667 B1 * | 12/2007 | Saulys et al. | 717/143 |
| 7,340,728 B2 * | 3/2008 | Kutter | 717/139 |
| 7,464,381 B1 * | 12/2008 | Nickerson et al. | 719/311 |
| 7,487,447 B1 * | 2/2009 | Jerger | 715/252 |
| 7,539,982 B2 * | 5/2009 | Stuart | 717/140 |
| 7,574,692 B2 * | 8/2009 | Herscu | 717/116 |
| 7,614,005 B2 * | 11/2009 | Feigenbaum | 715/762 |
| 7,665,073 B2 * | 2/2010 | Meijer et al. | 717/140 |
| 7,707,196 B2 * | 4/2010 | Bellaiche et al. | 707/705 |
| 7,798,417 B2 * | 9/2010 | Snyder et al. | 235/494 |
| 7,844,956 B2 * | 11/2010 | Rojer | 717/136 |
| 7,853,936 B2 * | 12/2010 | Levi | 717/143 |
| 7,895,570 B2 * | 2/2011 | Gibson et al. | 717/115 |
| 7,958,492 B2 * | 6/2011 | Schneider et al. | 717/116 |
| 8,196,121 B2 * | 6/2012 | Peshansky et al. | 717/140 |
| 8,201,153 B2 * | 6/2012 | Backhouse et al. | 717/136 |
| 2004/0061720 A1 | 4/2004 | Weber | |
| 2006/0136843 A1 | 6/2006 | Shafron | |
| 2007/0157118 A1 | 7/2007 | Wuttke | |
| 2007/0192725 A1 | 8/2007 | Chen | |
| 2008/0155425 A1 | 6/2008 | Murthy et al. | |
| 2008/0163090 A1 | 7/2008 | Cortright | |

FOREIGN PATENT DOCUMENTS

WO 2007/038587 4/2007

OTHER PUBLICATIONS

Suzuki et al, "Toward the interoperable software design models: quartet of UML, XML,DOM and CORBA", IEEE, pp. 163-172, 1999.*
Gonzalez et al, "Platform independent accessibility API: accessible document object model", ACM pp. 63-71, 2005.*
Rozinajova et al, "One approach to HTML wrappers cretaion using document object model tree", ACM pp. 1-6, 2009.*
Ghiani et al, "Push and pull of web uesr interfaces in multi device environments" ACM AVI pp. 10-17, 2012.*

* cited by examiner

*Primary Examiner* — Anil Khatri
(74) *Attorney, Agent, or Firm* — Myers Wolin, LLC

(57) ABSTRACT

A cross-platform toolbar and method thereof is disclosed. The toolbar includes a toolbar render object defining at least user interface elements of the cross-browser toolbar; a script file defining at least event handlers associated with the user interface elements; toolbar libraries including at least application programming interfaces (APIs) and script files supporting a specific web browser type; and a unique dynamic-link library (DLL) file assigned with the toolbar libraries and the script file.

15 Claims, 3 Drawing Sheets

CROSS-BROWSER TOOLBAR AND METHOD THEREOF FOR FACILITATING CROSS-BROWSER INTEROPERABILITY

TECHNICAL FIELD

This invention generally relates to browser extensions.

BACKGROUND OF THE INVENTION

Web browsers are software applications that enable the viewing of information accessible on the World Wide Web (or Web). At its most basic, the Web is a collection of documents written using programming languages that web browsers can interpret. Such languages include, for example, a hyper text markup language (HTML), an eXtensible markup language (XML), and the like. Microsoft® Internet Explorer®, Mozilla Firefox®, Safari®, and Opera® are just to name a few examples of web browsers.

Browser extensions are applications such as plug-ins or add-ons that are downloaded and installed on an individual computing device on which a web browser is operating. The browser extensions are compiled separately for each type of web browser. A prime example for a browser extension is a downloadable toolbar. When installed, a toolbar allows users to customize their browsing experience.

The process of creating a downloadable toolbar includes developing a software application compatible with a specific browser type and storing an executable application in a web server. The software application embodying the toolbar typically includes functional buttons, search windows, and application programming interfaces (APIs) for other plug-ins and interfaces. A user may download the executable application from a web server to a local computing device and run the application thereon, causing the toolbar to be integrated in the web browser.

There are some disadvantages with the current process of developing toolbars. Such a process requires programming and compiling software code for each type of web browser. Thus, a new version of the same toolbar should be developed for each web browser's type. This is typically performed by software developers who specialized in developing toolbars. Thus, existing toolbars are proprietary and in most cases not extensible.

Therefore, it would be advantageous to provide an automated solution for generating toolbars. It would be further advantageous to provide a solution for generating cross-browser toolbars.

SUMMARY OF THE INVENTION

Certain embodiments include a method for rendering a cross-platform toolbar. The method comprises providing a toolbar document object (TDO), wherein the TDO includes elements enabling cross-browser interoperability; and translating, at runtime, the TDO to a specific-browser document object model (DOM) of a web browser type on which the toolbar is being rendered.

Certain embodiments also include a method for generating a cross-browser toolbar. The method comprises generating a toolbar render object defining at least user interface elements of the cross-browser toolbar; generating a script file defining at least event handlers associated with the user interface elements; generating toolbar libraries including at least application programming interfaces (APIs) and script files supporting a specific web browser type; assigning a unique dynamic-link library (DLL) file with the toolbar libraries and the script file; and compiling the toolbar render object, the script file, the toolbar libraries, and the DLL file into an installer file adapted to enable the installation of the cross-browser toolbar in the specific web browser type.

Certain embodiments further include a cross-platform toolbar. The cross-platform toolbar comprises a toolbar render object defining at least user interface elements of the cross-browser toolbar; a script file defining at least event handlers associated with the user interface elements; toolbar libraries including at least application programming interfaces (APIs) and script files supporting a specific web browser type; and a unique dynamic-link library (DLL) file assigned with the toolbar libraries and the script file.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
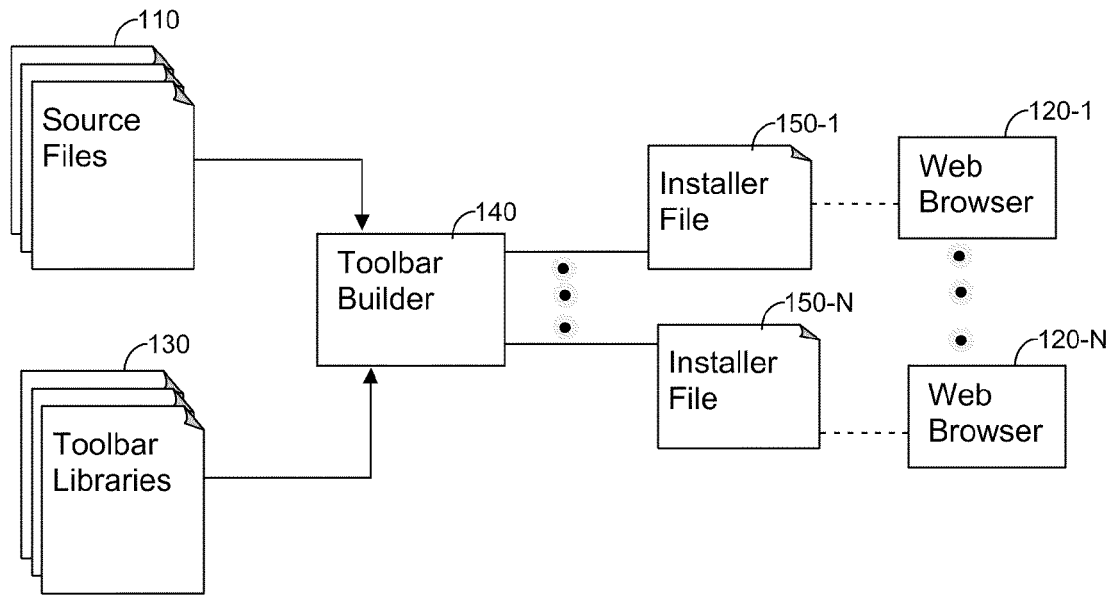
FIG. 1 is a diagram illustrating the process of creating a cross-browser toolbar utilized in accordance with the principles of the invention.
Figure 2:
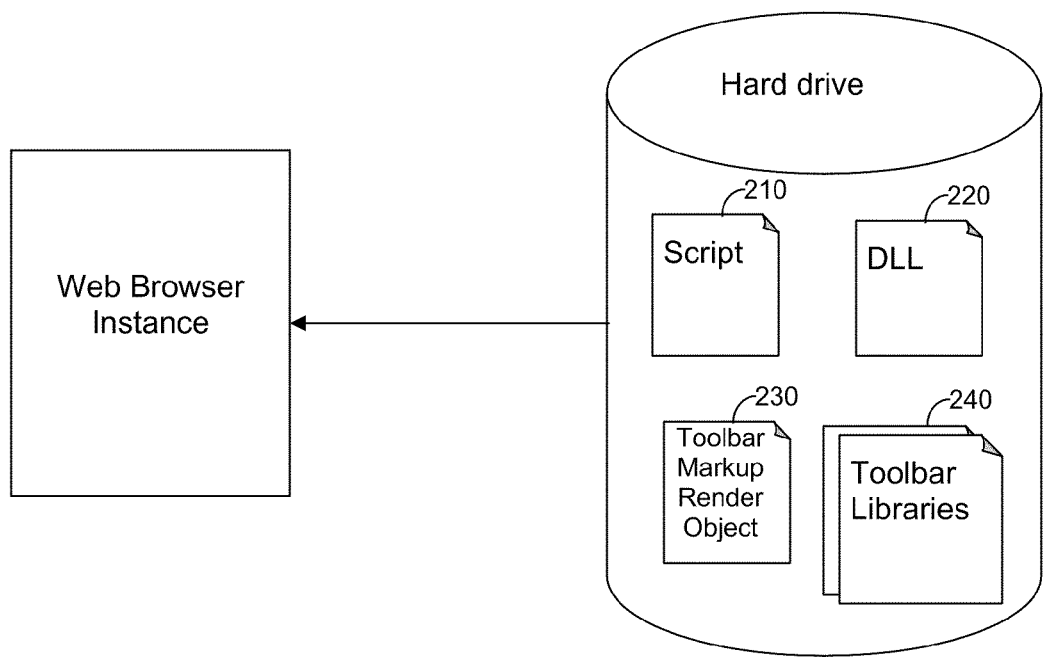
FIG. 2 illustrates the files used for executing a cross-browser toolbar over a web browser instance.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary diagram illustrating the process of creating a cross-browser toolbar implemented according to the principles of the invention. The process includes generating a toolbar which can be executed on any of web browsers 120-1 through 120-N. The toolbar functionality and appearance are defined by one or more source files 110. In one embodiment the source files 110 include one or more XML files that characterize user interface elements (e.g., buttons, menus, etc.) script files that set the functionality of the user interface elements using event handlers. The web browsers 120 are of different types and include, but are not limited to, Microsoft® Internet Explorer®, Mozilla® Firefox®, Opera®, Safari®, and the like.

Other files required for generating the cross-browser toolbar are stored in toolbar libraries 130. The libraries 130 contain at least files that provide low level APIs as well as XML and script files to support the different types of browsers 120. A toolbar builder 140 generates toolbar installer files 150-1 though 150-N, each of which is targeted to a different type of a web browser 120. For example, an installer file 150-1 may be installed and executed over an Internet Explorer® browser while an installer file 150-N may perform the same over a Firefox® browser. The toolbar builder 140 creates a specific installer file 150 by selecting files from the toolbar libraries 130 which are executable over a specific type of a browser 120 and assigning unique dynamic-link library (DLL) files with the scripts in source files 110 and relevant portions of the libraries 130. For instance, to generate the installer file 150-1 only files in the libraries 130 executable over an Internet Explorer® browser are selected. In addition, the toolbar builder 140 encapsulates these relevant files from the libraries 130, the source files 110 and optionally a unique DLL file into a downloadable file. For example, an installer file 150-N targeted to a Firefox® browser may not include a DLL file. In another embodiment the toolbar builder 140 may further output update files (not shown) including new elements and/or fixes that do not exist in previous versions of an already installed toolbar.

In a preferred embodiment of the invention the toolbar builder 140 may be a wizard application that allows developing a toolbar without coding, writing or providing any of the source files 110. In such embodiment a wizard executed by the toolbar builder 140 prompts the users to select user interface elements and event handlers of such elements through a graphical user interface (GUI). Based on the user selections the wizard generates the source files. The user is also prompted to select the type of web browsers on which he/she would like to run the toolbar. Thereafter, the toolbar builder 140 creates the installer files 150, each of which includes the self-generated source files and targeted to a different type of a browser.

Other files required for generating the cross-browser toolbar are stored in toolbar libraries 130. The libraries 130 contain at least files that provide low level APIs as well as XML and script files to support the different types of browsers 120. A toolbar builder 140 generates toolbar installer files 150-1 though 150-N, each of which is targeted to a different type of a web browser 120. For example, an installer file 150-1 may be installed and executed over an Internet Explorer® browser while an installer file 150-N may perform the same over a Firefox® browser. The toolbar builder 140 creates a specific installer file 150 by selecting files from the toolbar libraries 130 which are executable over a specific type of a browser 120 and assigning unique dynamic-link library (DLL) files with the scripts in source files 110 and relevant portions of the libraries 130. For instance, to generate the installer file 150-1 only files in the libraries 130 executable over an Internet Explorer® browser are selected. In addition, the toolbar builder 140 encapsulates these relevant files from the libraries 130, the source files 110 and optionally a unique DLL file into a downloadable file. For example, an installer file 150-N targeted to a Firefox® browser may not include a DLL file. In another embodiment the toolbar builder 140 may further output update files (not shown) including new elements and/or fixes that do not exist in previous versions of an already installed toolbar.

In accordance with the principles of the invention the generated toolbar is based on a toolbar document object (TDO) having a structure similar to a standard document object model (DOM) but with enhanced functionality. Generally, most types of browsers support a DOM which is an API for HTML and XML documents. The DOM provides a structural representation of the document, enabling modification its content and visual presentation. That is, a DOM connects web pages to scripts or applications.

In an embodiment of the invention the TDO has a tree representation where each node in the tree is a user-interface element. These elements support standard tags (e.g., XUL tags) and special tags. The special tags are a set of tags designed to provide enhanced toolbar functions, referred to as special functions. Examples for such tags include, but are not limited to, a search-bar for providing a search engine input field, a RSS button for accessing RSS feeds, a web inspector button for performing background anti-phishing checks, a widget menu popup providing a list of widgets, and so on. A special tag may include a set of attributes allowing for customizing a special function defined by the special tag. Such attributes may include, but are not limited to, on-get-options, verifying-image, low-risk-image, high-risk-image, verified-image, white-list-image, black-list-image, no-rating-image, on-get-options, on-add-widget, on-widget-done, on-remove-widget, on-get-prefpane, and so on. In one embodiment the special tags may be XML-based tags. The special tags are stored in the toolbar libraries 240. The set of special tags can be extended by developers who may provide their own set of tags and functions.

In accordance with an embodiment of the invention one of the elements of a TDO is a widget which may be an application or a control executed from a toolbar. A toolbar can be pre-installed with a list of widgets or such widgets may be added to the toolbar by dragging a widget from a central repository and dropping the widget to the toolbar. Widgets may include, but are not limited to, a media player, an online game, an online interactive program, visual animations, and so on.

Figure 3:
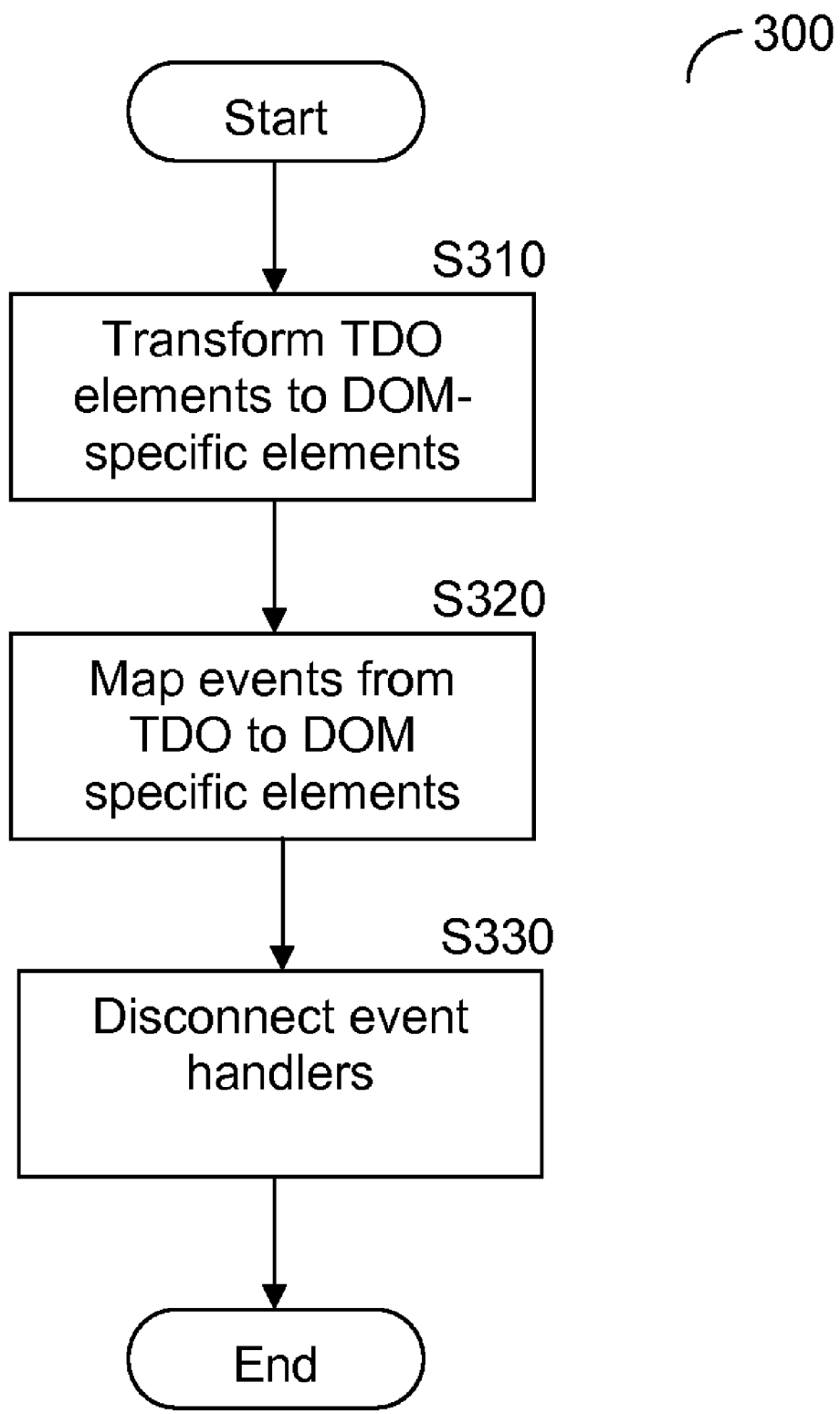
FIG. 3 is a flowchart describing the process of translating a TDO to a browser-specific DOM at runtime as implemented in accordance with an embodiment of the invention.

TDO and DOM are memory structures created at runtime in a local memory (of a computing device) allocated for the execution of a browser. As mentioned above the execution of a toolbar generated in accordance with the principles of the invention is allowed by translating the TDO to a browser-specific DOM of a target browser at runtime. This process is further illustrated using a flowchart 300 shown in FIG. 3.

At S310, TDO elements are translated into one or more browser-specific DOM elements. For instance, when targeting a HTML DOM (for Internet Explorer), a TDO toolbar button element is rendered by a HTML table, which contains specific table cell elements for a button's border, a icon, label, and button's dropdown area. As another example, in a Firefox browser, a button element defined in the TDO is rendered as a single XUL DOM element of type 'toolbarbutton'. At S320, event handlers are mapped from events of the TDO to events of the browser-specific DOM. The events may be triggered by an input device (e.g., a mouse, a keyboard, etc.). Step S320 is performed after rendering the browser-specific DOM in order to increase the performance in cases of complex user interfaces. This also allows tracking memory management by determining which events are connected to ensure that such events are later properly disconnected, thereby breaking circular dependencies resulting in memory leaks in browser-specific DOMs. At S330, when TDO elements are discarded, circular dependencies and script closures on event handlers are disconnected. This ensures that the memory can be properly reclaimed by a browser-specific garbage collector.

Figure 4:
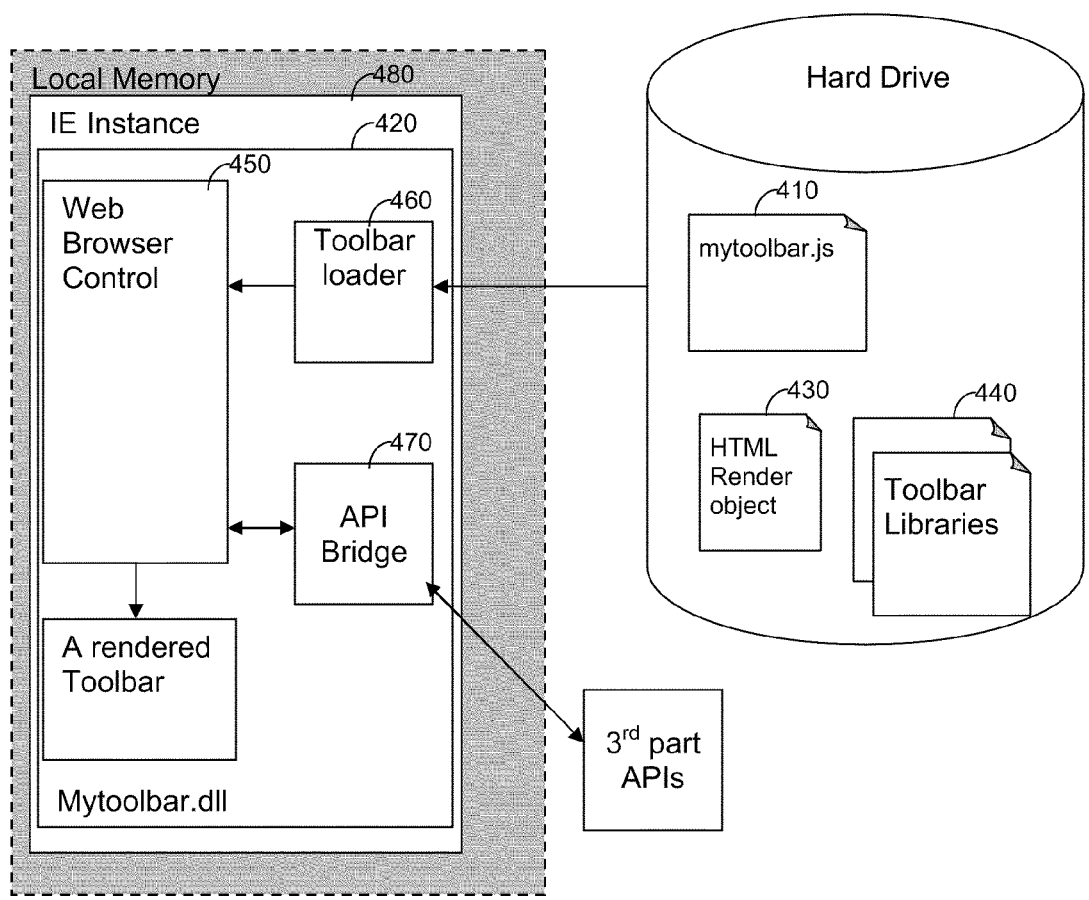
FIG. 4 is a diagram useful for describing the process of executing a toolbar over an Internet Explorer (IE) browser as implemented in accordance with an embodiment of the invention.

FIG. 4 shows an exemplary diagram useful in describing the process of executing a toolbar over an Internet Explorer® (IE) browser implemented in accordance with an embodiment of the invention. The toolbar "mytoolbar" is constructed using the toolbar builder 140 and after installation a JavaScript® file "mytoolbar.js" 410, a DLL file "mytoolbar.dll" 420, a HTML render object 430 and as toolbar libraries 440 are stored in a local hard drive.

At runtime, a DLL file 420 is loaded to an instance 480 of an IE browser. The DLL 420 manages a web-browser control 450, a toolbar loader 460, and an API bridge 470. The control 450 hosts the TDO and allows rendering the toolbar using the process described in detail above. The API bridge 470 provides an interface for communicating with other software applications running on the local computing device. In accordance with one embodiment, the toolbar loader 460 is adapted to support a "chrome://" protocol by providing a mechanism to enable "chrome://" protocol functionality in an IE instance 480 that executes the toolbar. For example, this allows to chrome URLs look and perform as same as in a Firefox® browser, thereby achieving cross-browser interoperability. It should be appreciated by one of ordinary skill in the art that the "chrome://" protocol is a proprietary protocol of Mozilla® Firefox® and is not supported by Internet Explorer® browsers. The toolbar load 460 is further adapted to retrieve information from the script file 410, the HTML render object 430 and the toolbar libraries 440 stored in the local hard drive.

In accordance with one embodiment the cross-browser toolbar may be developed using asynchronous JavaScript® and XML (AJAX®) techniques while supporting scripting and programming languages including, for example, XML, HTML and JavaScript®.

The principles of the invention may be implemented in hardware, software, firmware or any combinations thereof. The software may be implemented as an application program tangibly embodied on a program storage unit or computer readable medium. The application program may be uploaded to, and executed by, a machine comprising any suitable architecture, for example a computer platform having hardware such as one or more central processing units ("CPUs"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

All statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included.

What I claim is:

1. A computer implemented method for rendering and displaying a cross-browser toolbar, comprising:
    providing a toolbar document object (TDO), wherein the TDO includes elements enabling a cross-browser interoperability and is a memory structure hosted by a web browser control of a web browser instance;
    translating, at runtime, the TDO to a specific-browser document object model (DOM) of a web browser type on which the cross-browser toolbar is being rendered;
    wherein translating the TDO to the browser-specific DOM further comprising:
    translating each element of the TDO to an equivalent browser-specific DOM element;
    mapping each handler of each event defined in the TDO to an equivalent browser-specific DOM event handler; and
    disconnecting circular dependencies and scripts closures on event handlers when TDO elements are discarded.

2. The method of claim 1, wherein the type of the web browser is any of: a Microsoft Internet Explorer, a Mozilla Firefox, Safari, and an Opera.

3. The method of claim 1, wherein elements of the TDO are arrange in a tree structure.

4. The method of claim 3, wherein the elements include at least special tags defining special functions of the cross-browser toolbar, and wherein each of special tags has a set of attributes for customizing a special function defined by the special tag.

5. The method of claim 4, wherein the special tags include at least one of: a search-bar for providing a search-bar input field, a RSS-button for accessing RSS feeds, a web-inspector button for performing background anti-phishing checks, and a widget-menu-popup for providing a list of widgets.

6. The method of claim 5, wherein a widget is at least a software application or a control executed from the cross-browser toolbar.

7. The method of claim 1, wherein translating TDO elements further comprising: translating chrome:// protocol elements to an Internet Explorer DOM elements.

8. A computer readable medium having stored thereon computer executable code when executed causing a processor to perform a process of rendering a cross-platform toolbar, the process comprising:
    providing a toolbar document object (TDO), wherein the TDO includes elements enabling a cross-browser interoperability and is a memory structure hosted by a web browser control of a web browser instance;
    translating, at runtime, the TDO to a specific-browser document object model (DOM) of a web browser type on which the cross-browser toolbar is being rendered;
    wherein translating the TDO to the browser-specific DOM further comprising:
    translating each element of the TDO to an equivalent browser-specific DOM element;
    mapping each handler of each event defined in the TDO to an equivalent browser-specific DOM event handler; and
    disconnecting circular dependencies and scripts closures on event handlers when TDO elements are discarded.

9. The computer readable medium of claim 8, wherein translating the TDO to the browser-specific DOM further comprising:
    translating each element of the TDO to an equivalent browser-specific DOM element; and
    mapping each handler of each event defined in the TDO to an equivalent browser-specific DOM event handler.

10. The computer readable medium of claim 9, further comprising:
    disconnecting circular dependencies and scripts closures on event handlers when TDO elements are discarded.

11. The computer readable medium of claim 9, wherein translating TDO elements further comprising: translating chrome:// protocol elements to an Internet Explorer DOM elements.

12. A method for generating a cross-browser toolbar, comprising:
- generating a toolbar render object defining at least user interface elements of the cross-browser toolbar;
- generating a script file defining at least event handlers associated with the user interface elements;
- generating toolbar libraries including at least application programming interfaces (APIs) and script files supporting a specific web browser type;
- assigning a unique dynamic-link library (DLL) file with the toolbar libraries and the script file; and
- compiling the toolbar render object, the script file, the toolbar libraries, and the DLL file into an installer file adapted to enable the installation of the cross-browser toolbar in the specific web browser type, wherein the toolbar libraries comprise special tags defining special functions of the cross-browser toolbar, and wherein each of the special tags has a set of attributes for customizing a special function defined by the special tag.

13. The method of claim 12, wherein the toolbar render object is configured to render at least a hyper text markup language (HTML) web page or an XML user interface language (XUL) web page.

14. A computer readable medium having stored thereon computer executable code when executed causing a processor to perform a process of generating a cross-browser toolbar, comprising:
- generating a toolbar render object defining at least user interface elements of the cross-browser toolbar;
- generating a script file defining at least event handlers associated with the user interface elements;
- generating toolbar libraries including at least application programming interfaces (APIs) and script files supporting a specific web browser type;
- assigning a unique dynamic-link library (DLL) file with the toolbar libraries and the script file; and
- compiling the toolbar render object, the script file, the toolbar libraries, and the DLL file into an installer file adapted to enable the installation of the cross-browser toolbar in the specific web browser type, wherein the toolbar libraries comprise special tags defining special functions of the cross-browser toolbar, and wherein each of the special tags has a set of attributes for customizing a special function defined by the special tag.

15. A cross-platform toolbar, comprising:
- a toolbar render object defining at least user interface elements of the cross browser toolbar;
- a script file defining at least event handlers associated with the user interface elements;
- toolbar libraries including at least application programming interfaces (APIs) and script files supporting a specific web browser type; and
- a unique dynamic-link library (DLL) file assigned with the toolbar libraries and the script file; and
- the toolbar render object, the script file, the toolbar libraries, and the DLL file are compiled into an installer file on a computer readable medium adapted to enable the installation of the cross-browser toolbar in the specific web browser type, wherein the toolbar libraries comprise special tags defining special functions of the cross-browser toolbar, and wherein each of the special tags has a set of attributes for customizing a special function defined by the special tag.

* * * * *